(12) United States Patent
Quendez

(10) Patent No.: US 12,351,278 B2
(45) Date of Patent: Jul. 8, 2025

(54) ELECTRIC DRIVE SYSTEM FOR CRAFT, SUCH AS A SURFBOARD OR PADDLEBOARD, WITH COOLING MEANS

(71) Applicant: MOTION CONCEPT GROUP, Bordeaux (FR)

(72) Inventor: Nicolas Quendez, Chézy-en-Orxois (FR)

(73) Assignee: MOTION CONCEPT GROUP, Bordeaux (FR)

( * ) Notice: Subject to any disclaimer, the term of this patent is extended or adjusted under 35 U.S.C. 154(b) by 483 days.

(21) Appl. No.: 17/639,133

(22) PCT Filed: Aug. 28, 2020

(86) PCT No.: PCT/EP2020/074072
§ 371 (c)(1),
(2) Date: Feb. 28, 2022

(87) PCT Pub. No.: WO2021/038037
PCT Pub. Date: Mar. 4, 2021

(65) Prior Publication Data
US 2022/0324538 A1 Oct. 13, 2022

(30) Foreign Application Priority Data
Aug. 28, 2019 (FR) ...................... 1909454

(51) Int. Cl.
*B63B 32/10* (2020.01)
*B63B 34/10* (2020.01)
(Continued)

(52) U.S. Cl.
CPC .............. *B63B 32/10* (2020.02); *B63B 34/10* (2020.02); *B63B 79/40* (2020.01); *B63H 21/17* (2013.01);
(Continued)

(58) Field of Classification Search
CPC ......... B63B 32/10; B63B 34/10; B63B 79/40; B63H 21/17; B63H 21/38; B63H 23/34; H02K 1/2791; H02K 9/22; Y02T 70/5236
See application file for complete search history.

(56) References Cited

U.S. PATENT DOCUMENTS 8,427,019 B2 * 4/2013 Garriga .................. H02K 5/203
310/59
10,647,392 B2 * 5/2020 Trewern .................. B63B 34/40
(Continued)

FOREIGN PATENT DOCUMENTS

CN        208484799 U       2/2019
DE    102018102740 A1       8/2019
(Continued)

*Primary Examiner* — Anthony D Wiest
(74) *Attorney, Agent, or Firm* — AEON Law, PLLC; Adam L. K. Philipp; Charlotte E. Holoubek

(57) ABSTRACT

The invention relates to a motorization system for an electrically assisted craft which is intended to allow a user to be transported on water, the invention being used particularly in the field of surfboards, paddleboards or sailboards, and in the field of kayaks or canoes.

Figure 1:
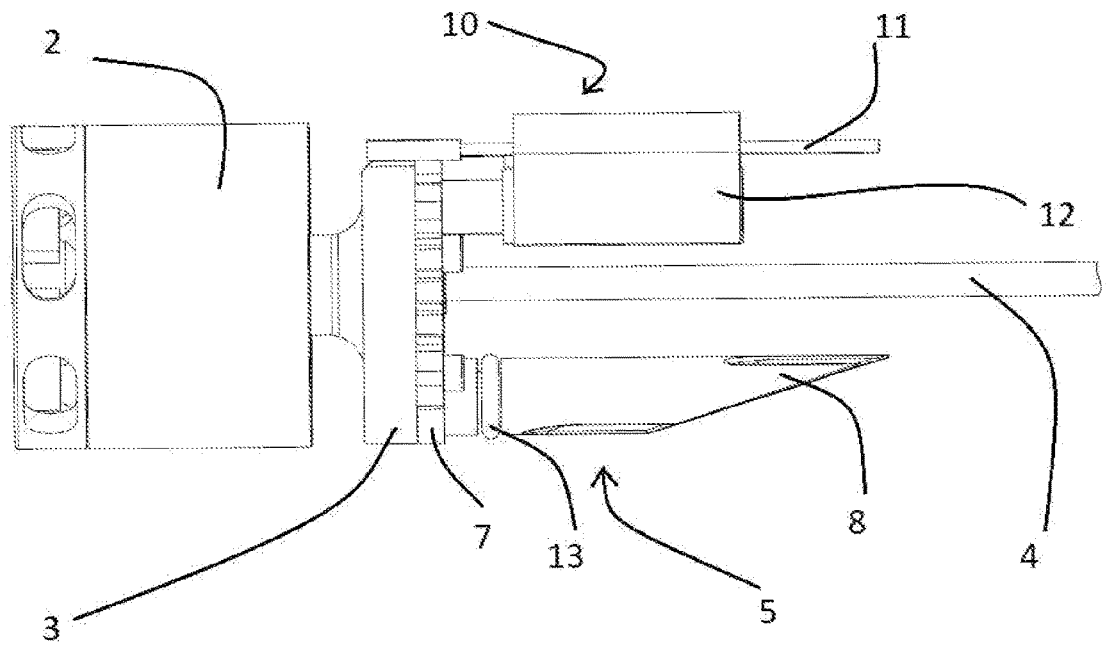

The electric motorization system is configured to be connected to an electrical energy source and comprises, on the one hand, a watertight enclosure 1 which is intended to be integrated in or on a craft, in which enclosure 1 a rotor 2 and a stator 3, 7 are arranged, and, on the other hand, a shaft 4 which is connected at a first end to the rotor 2 and which protrudes in a watertight manner outside the enclosure 1 at a second end opposite its first end. The shaft 4 can be connected at its second end to propulsion means of a craft, such as a propeller, so that when the system is supplied with electrical energy, the rotor 2 is rotated and drives the shaft 4 with this rotation.

The system also comprises cooling means 5 which themselves comprise at least one first elongate assembly 5, which (Continued)

is at least partially made of metal, and a first end of which is arranged inside the enclosure 1, the elongate assembly 5 protruding in a watertight manner outside the enclosure 1 at a second end opposite its first end so as to allow conduction of the heat from the inside to the outside of the enclosure 1 along the first elongate assembly 5.

19 Claims, 3 Drawing Sheets

(51) Int. Cl.
*B63B 79/40* (2020.01)
*B63H 21/17* (2006.01)
*B63H 21/38* (2006.01)
*B63H 23/34* (2006.01)
*H02K 1/2791* (2022.01)
*H02K 9/22* (2006.01)

(52) U.S. Cl.
CPC ............. *B63H 21/38* (2013.01); *B63H 23/34* (2013.01); *H02K 1/2791* (2022.01); *H02K 9/22* (2013.01)

(56) References Cited

U.S. PATENT DOCUMENTS

| | | |
|---|---|---|
| 2004/0155539 A1 | 8/2004 | Potoradi et al. |
| 2008/0168937 A1 | 7/2008 | Ruan et al. |
| 2011/0201238 A1 | 8/2011 | Rott et al. |
| 2013/0157526 A1 | 6/2013 | Martin |
| 2018/0072383 A1 | 3/2018 | Montague et al. |

FOREIGN PATENT DOCUMENTS

| | | |
|---|---|---|
| DE | 102018102750 A1 | 8/2019 |
| WO | 2019129687 A1 | 7/2019 |
| WO | 2019143276 A1 | 7/2019 |

* cited by examiner

ELECTRIC DRIVE SYSTEM FOR CRAFT, SUCH AS A SURFBOARD OR PADDLEBOARD, WITH COOLING MEANS

RELATED APPLICATIONS

This application is a U.S. National Phase of PCT Patent Application No. PCT/EP2020/074072 having International filing date of Aug. 28, 2020, which claims the benefit of priority of French Patent Application No. 1909454 filed on Aug. 28, 2019. The entire contents of the above-referenced applications and of all priority documents referenced in the Application Data Sheet filed herewith are hereby incorporated by reference for all purposes.

The present invention relates to a motorization system for an electrically assisted craft intended to allow a user to be transported on water. It finds a particular application in the field of surfboards, paddleboards, or even windsurfing boards, as well as in the field of kayaking or canoeing.

As an example, a surfboard aims to allow a user to slide on the water under the propulsion action provided by a wave. Generally, in the absence of waves in a given area where the user is, the latter, lying on the board, uses his arms to provide the propulsion necessary for the board to reach an area where a wave is formed or is being formed.

Another example consists of a paddleboard which, for its part, aims to allow a user to slide on the water under the propelling action of a user equipped with a paddle. As with a surfboard, the paddleboard can also allow the user to slide on the water under the propulsion action provided by a wave.

Other examples exist of craft which allow a user to navigate on water, by means of a mechanical propelling action which the user himself provides directly or by use of a means such as one or more paddles or oars, and/or by means of a propulsive action provided by the environment such as wind or a wave.

To facilitate the use of these crafts, in particular to facilitate propulsion in areas or at times where the mechanical propulsion action provided by the user or by the environment is not sufficient, these crafts can be equipped with electric assistance, i.e. an electric motor system that drives mechanical propulsion means such as a propeller.

In general, marine propulsion by propeller requires the propeller to rotate at a relatively low speed, to avoid propeller cavitation phenomena.

It is conventionally possible to use two types of electric motor to drive the propeller in rotation: motors of the "inrunner" type, in which the internal core rotates in a fixed external cage, and motors of the "outrunner" or rotating cage type, in which the outer cage rotates around the fixed inner core.

"Inrunner" type motors can be cooled relatively easily because the external part being fixed, it can be brought into contact with a cooling system provided for this purpose. However, these motors generally rotate very quickly, and therefore require the use of reducers to avoid the cavitation phenomena mentioned above. This results in loss of efficiency and increased mechanical complexity, with correspondingly increased maintenance and costs.

"Outrunner" type motors rotate, for a given external diameter, less quickly than "inrunner" type motors, which therefore limits cavitation phenomena without the complication linked to the use of reducers as explained in the previous paragraph. Indeed, with an "outrunner" type motor, one can maximize the diameter of interaction between the coils of the fixed stator, in the center, and the magnets of the rotor rotating outside. The use of an "outrunner" type motor in a watertight closed enclosure therefore makes it possible to obtain a propeller which turns more slowly without the use of reducers. However, unlike "inrunner" type motors, these "outrunner" type motors are difficult to cool insofar as the external part rotates and therefore cannot be brought into contact with a conventional cooling system such as a cold wall.

Conventional solutions for cooling an "outrunner" type motor, such as the use of water circulation inside the fixed part of the motor, are not satisfactory. Indeed, they require the presence of pipes inside the motor, a water inlet and outlet, which is complicated to implement.

One of the aims of the invention is therefore to solve in particular the aforementioned problems. Thus, the aim of the invention is in particular to propose an electric motorization system for a craft, such as a surfboard or paddle board, configured to be connected to a source of electrical energy.

The system comprises a watertight enclosure intended to be integrated into or on a craft, in which enclosure are arranged a rotor and a stator, and a shaft connected by a first end to the rotor and projecting in a watertight manner outside the enclosure by a second end opposite its first end.

The shaft is adapted to be connected by its second end to means of propulsion of a craft, such as a propeller, so that when the system is supplied with electrical energy, the rotor begins to rotate and drives the shaft. in this rotation.

The system further comprises cooling means. These cooling means comprise at least a first elongated assembly, at least partially metallic, a first end of which is arranged inside the enclosure. This elongated assembly protrudes in a watertight manner outside the enclosure by a second end opposite its first end, so as to allow conduction of heat from the interior to the exterior of the enclosure along said first elongated assembly.

According to certain embodiments, the system also comprises one or more of the following features, taken separately or in all technically possible combinations:

- the first end of the first elongated assembly is fastened to the stator;
- the stator comprises at least one fastening element, such as a fastening plate, and the first end of the first elongated assembly is linked to said fastening element;
- the first elongated assembly comprises at least a first part, such as a rod, formed integrally with at least part of the stator;
- the first elongated assembly comprises at least a first part, such as a rod, forced into a housing provided in the stator, said housing comprising a pasty heat-conducting material, such as a heat-conducting silicone;
- at least the first part of the first elongated assembly is a rod with a substantially circular section;
- the first elongated assembly is a rod with a circular section protruding from the enclosure in a watertight manner by means of an O-ring;
- the system comprises an electronic control unit configured to control the operation and the power supply of said system, and fastened to the stator, so as to create a thermal path between the control unit and the first elongated assembly to allow conduction of the heat emitted by the control unit to the outside of the enclosure along said thermal path and the first elongated assembly;
- the system comprises an electronic control unit arranged inside the enclosure and configured to control the operation and the power supply of the system, and the cooling means comprise at least a second elongated assembly, at least partially metallic, fastened by a first end to the control unit and projecting in a watertight manner outside the enclosure by a second end opposite its first end, so as to allow conduction of heat from the control unit to the outside of the enclosure along the second elongated assembly;

at least a part of the second elongated assembly is a rod with a substantially circular section;

the second elongated assembly is a rod with a circular section protruding from the enclosure in a watertight manner by means of an O-ring;

the second end of the first and/or of the second elongated assemblies has slats spaced apart and formed parallel to the axis of the first, respectively second, elongated assemblies;

the rotor comprises a rotating cage, and the stator comprises a fixed core arranged inside the cage.

The invention also relates, according to a second aspect, to a craft, such as a surfboard or paddleboard, with electrical assistance, comprising means of propulsion capable of allowing the craft to progress on or in the water, and a source of electrical energy.

The craft further comprises an electric motorization system as presented above, the watertight enclosure of which is integrated on or in the craft, and the shaft of which is connected by its second end to the means of propulsion, so as to allow the driving of the propulsion means when the electric motorization system is supplied with electrical energy by said source, and the cooling of the electric motorization system by heat exchange between the second end of the first elongated assembly and the surrounding water.

Thus, the motorization system of the invention makes it possible to obtain an electrically assisted craft whose propulsion does not require a complex, expensive mechanical parts requiring special maintenance, such as a reduction gear, nor complicated cooling means, also expensive and requiring special maintenance.

Indeed, with the system of the invention, the evacuation of the heat is done along a thermal path guided by an elongated assembly. This thermal path leads from the inside of the watertight enclosure of the motor to the outside, where the heat escapes into the surrounding water.

Figure 2:
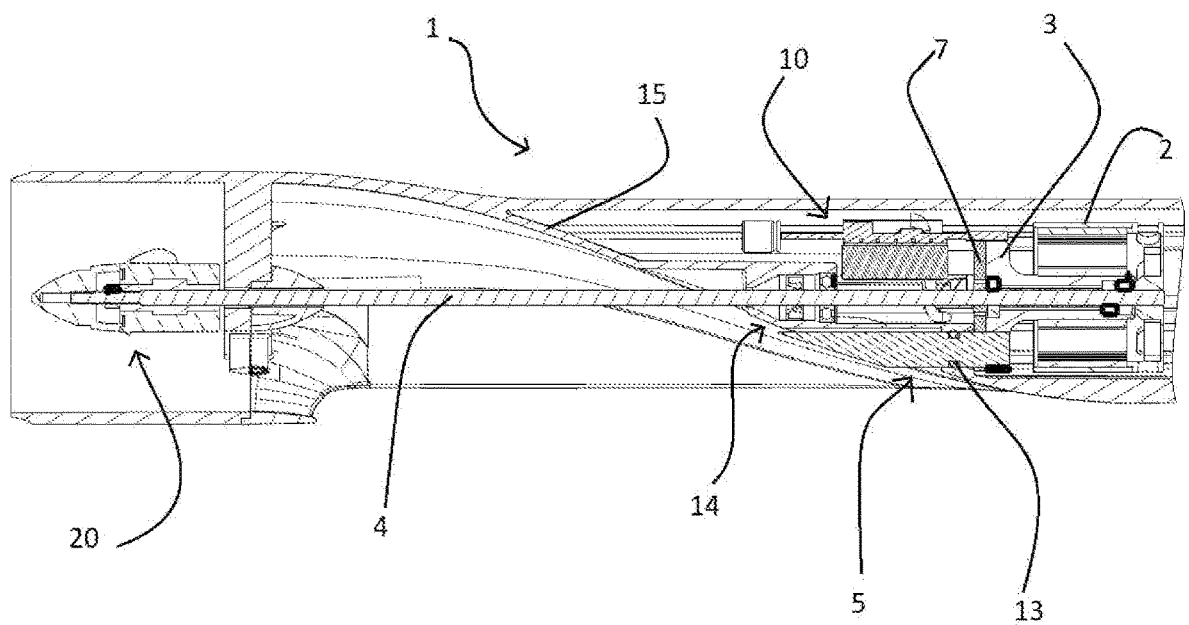
Figure 3:
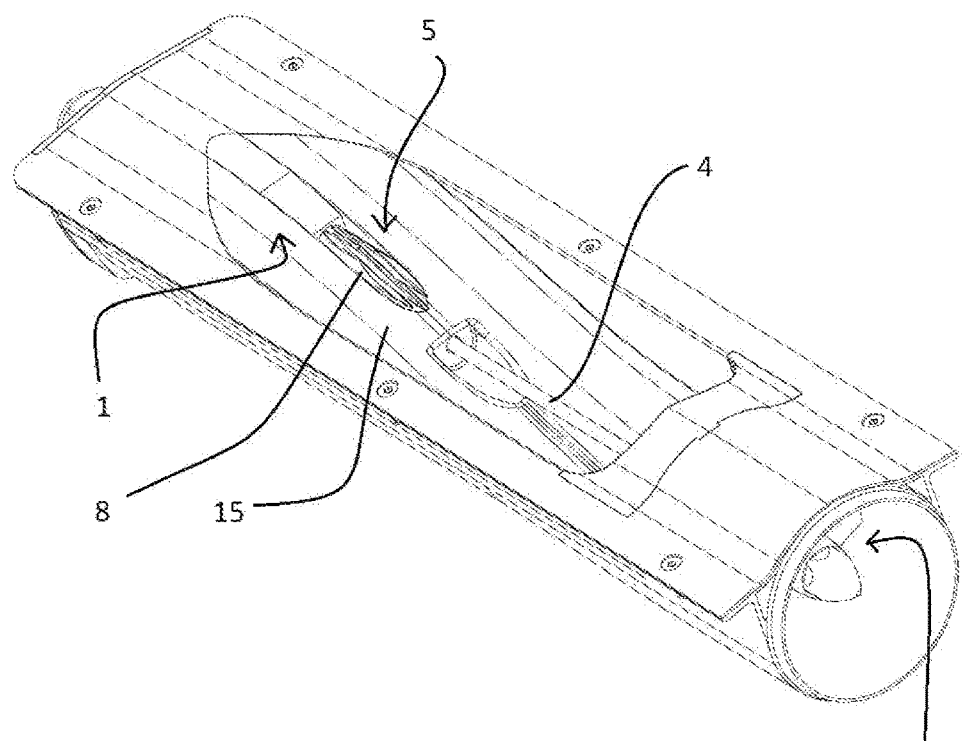
Figure 4:
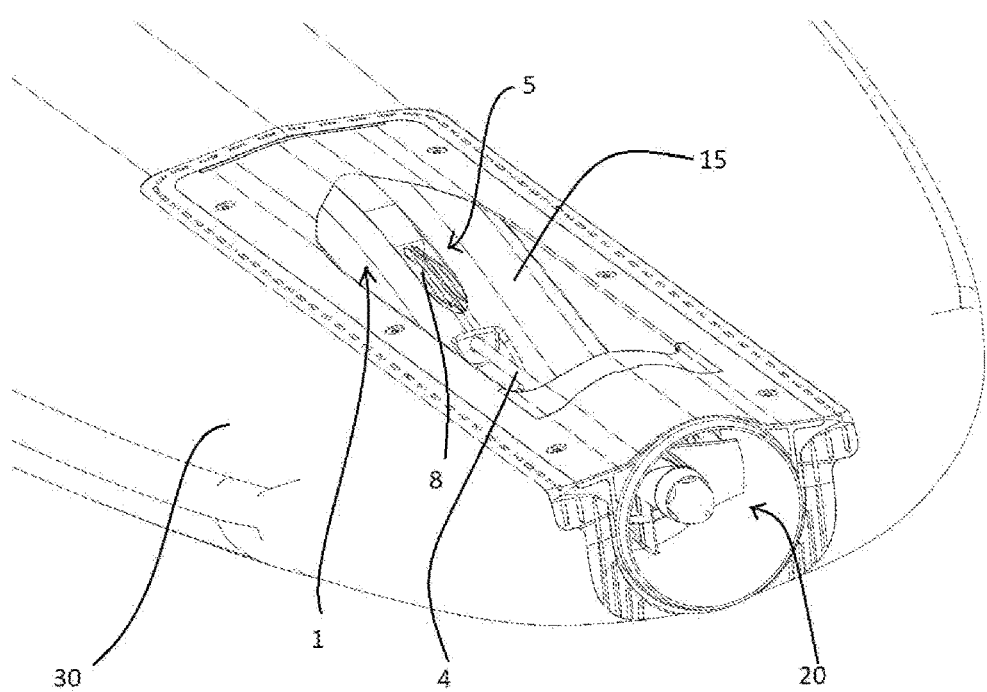
Figure 5:
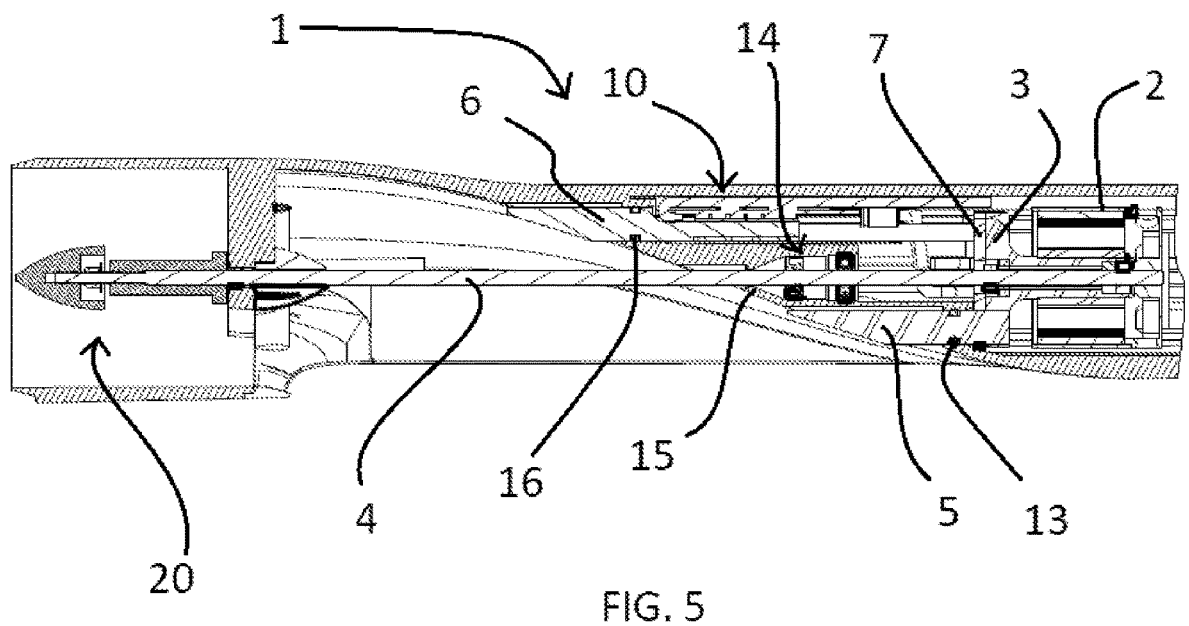
Figure 6:
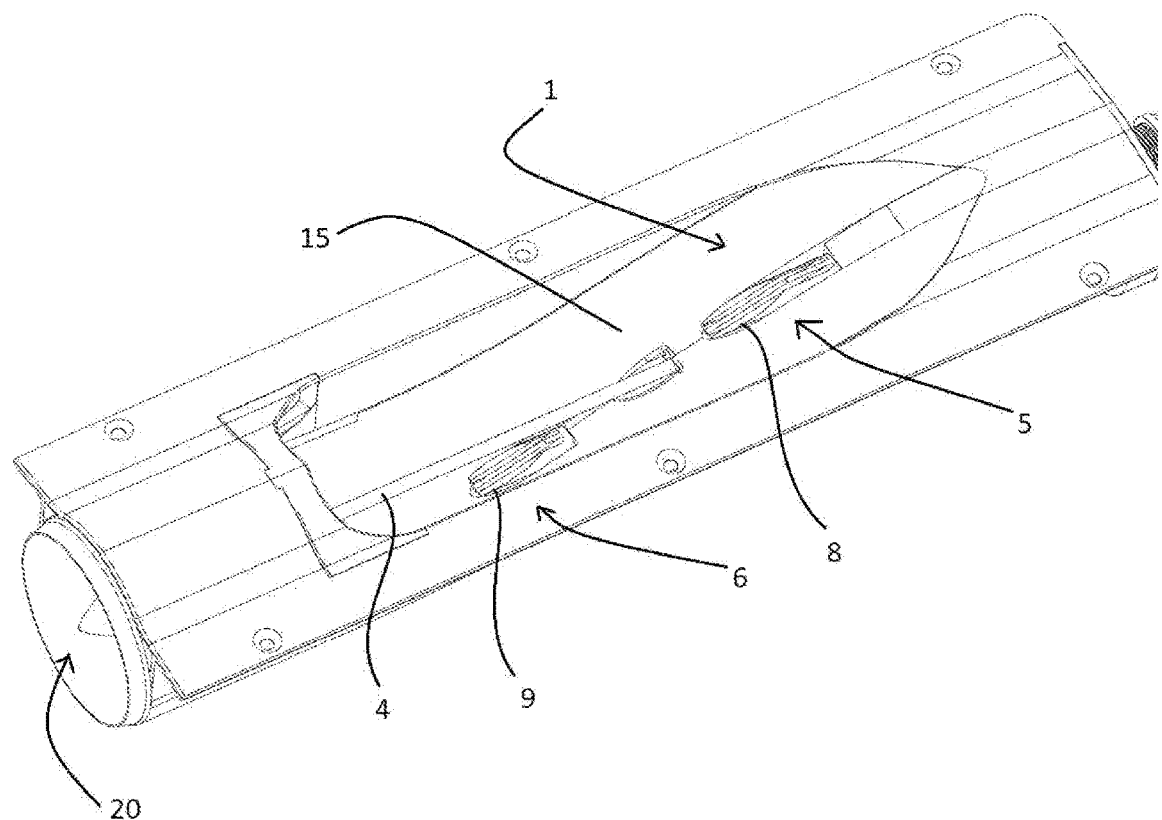

The characteristics and advantages of the invention will appear on reading the following description, given solely by way of example, and not limiting, with reference to the following appended figures:

FIG. 1: schematic representation of a first example of a system according to the invention outside its watertight enclosure;

FIG. 2: schematic representation of the example of FIG. 1, in longitudinal section, integrated into its watertight enclosure and connected to the means of propulsion of a craft;

FIG. 3: schematic representation of the example of FIG. 1, in perspective, integrated into its watertight enclosure and connected to the means of propulsion of a craft;

FIG. 4: schematic representation of an example of a craft according to the invention, incorporating the system of FIG. 1;

FIG. 5: schematic representation of a second example of a system according to the invention, in longitudinal section, integrated into its watertight enclosure and connected to the means of propulsion of a craft;

FIG. 6: schematic representation of the example of FIG. 5, in perspective.

With reference to all the figures, and in particular to FIGS. 3, 4 and 6, the electric motorization system for a craft 30 is configured to be connected to a source of electrical energy (not shown), such as a battery, which is also arranged on or in the craft 30.

The system comprises a watertight enclosure 1, intended to be integrated on or in the electrically assisted craft 30, as seen in the example of FIG. 4. In this example, the craft 30 is of the surfboard or paddleboard type.

The craft 30 comprises means of propulsion 20 intended to allow its progression in the water, such as a propeller 20, connected to one of the ends of the shaft 4 of the motorization system which will be described in detail later, the other end of the shaft 4 being arranged inside the enclosure 1 and therefore not visible in FIG. 4. The craft 30 also includes the source of electrical energy mentioned above, not shown.

The first elongated assembly 5 of the cooling means of the motorisation system, and possibly the second elongated assembly 6 in the example of FIG. 6, which will also be described in detail later, protrude by one of their ends from the enclosure, their other end being disposed inside the enclosure 1 and therefore not visible in FIGS. 3, 4 and 6.

The whole of the motorization system is integrated into the craft 30, so that this end of the first elongated assembly 5 (and possibly of the second elongated assembly 6) protruding from the enclosure 1 is located in the surrounding water when the craft 30 is in or on the water.

Thus, when the motorization system is supplied with electrical energy by the electrical energy source, the propulsion means 20 are driven by the shaft 4 and the motorization system can be cooled by heat exchange between the end of the first elongated assembly 5 (and possibly the second elongated assembly 6) protruding from the enclosure 1, and the surrounding water.

In the examples of FIGS. 4, 5 and 6, the enclosure 1 is closed in particular by a wall 15, through which the shaft 4 and the first elongated assembly 5 (and possibly the second elongated assembly 6) protrude in watertight manner, and extends beyond this wall 15 to form a turbine inside which the propulsion means 20 are both protected and in motion.

This wall 15 is inclined with respect to the shaft 4 and the longitudinal axis of the craft 30, so as not to create a surface rupture with respect to the main surface of the craft 30, which would be detrimental to the hydrodynamics and the performance of means of propulsion 20.

The end of the first elongated assembly 5 (and possibly of the second elongated assembly 6) protruding from the enclosure 1, in the examples of FIGS. 3, 4 and 6, is flush with the surface of the wall 15. A longer protrusion is not necessarily necessary to obtain the desired cooling effect, and could there again be detrimental to the hydrodynamics and the performance of the means of propulsion 20. Also, when this wall 15 is inclined as explained above, the end of the first elongated assembly 5 (and possibly of the second elongated assembly 6) protruding from the enclosure 1, can be bevelled so that this end follows the inclined surface of the wall 15.

In a variant embodiment, the turbine part of the enclosure 1 could quite simply be absent, the part of the shaft 4 protruding from the enclosure 1 and the propulsion means 20 being housed in a housing provided in the craft 30 in extension of the enclosure 1, or even exceeding out of the craft 30 outside any housing.

Alternatively, the turbine part could be present but separate from enclosure 1.

With reference to all the figures, and in particular to FIGS. 1, 2 and 5, the motorization system comprises a rotor 2 and a stator 3, 7, arranged inside the watertight enclosure 1. The shaft 4 is connected by a first end to the rotor 2 and protrudes in a watertight manner outside the enclosure 1 by its second end opposite the first one to be able to be connected to the means of propulsion 20 of the craft 30 as explained above. Sealing means 14 of the gasket type are provided to ensure the watertight sealing of the enclosure 1 at the level of the passage of the shaft 4.

Thus, when the system is supplied with electrical energy, the rotor 2 begins to rotate and drives the shaft 4 in this rotation, which finally allows the rotation of the propulsion means 20 and therefore the propulsion of the craft 30.

Cooling means 5 (in the example of FIG. 1 to 4) or 5, 6 (in the example of FIGS. 5 and 6) are provided. These means 5, 6 comprise one or more elongated assemblies 5, 6, at least partially metallic, the respective first ends of which are arranged inside the enclosure 1. These elongated assemblies 5, 6 also protrude in a watertight manner outside the enclosure 1 via respective second ends, opposite their respective first ends. Sealing means 13, respectively 16, of the gasket type, are provided to ensure the watertight sealing of the enclosure 1 at the level of the respective passages of the elongated assemblies 5, 6.

Thus, the heat inside the enclosure, produced by the operation of the motorization system, in particular the rotation of the rotor 2, is conducted from the inside towards the outside of the enclosure 1 along the elongated assemblies 5, 6.

In the examples shown in the figures, the first end of the first elongated assembly 5 is fixed to the stator 3, 7.

This stator 3, 7 may comprise a stator part 3 strictly speaking, and a fastening element 7, for example a fastening plate 7. In this case, the first end of the first elongated assembly 5 is preferably attached to this fastening element 7.

The first elongated assembly 5 comprises at least a first part, such as a rod 5, formed integrally with at least a part of the stator 3, 7.

Alternatively, the first elongated assembly 5 comprises at least a first part, such as a rod 5, forced into a housing provided in the stator 3, 7. In this case, the housing includes a heat-conducting paste material, such as a heat-conducting silicone.

In the examples shown in the figures, whether the first elongated assembly 5 is formed integrally with any part of the stator 3, 7, or whether it is forced into a housing provided in the stator 3, 7, it is formed integrally by a heat-conducting metal rod 5.

An electronic control unit 10 is provided and configured to control the operation and the power supply of the motorization system.

Such a control unit conventionally comprises a microcontroller positioned in an electronic circuit formed on an electronic card 11.

This control unit 10 can be fastened to the stator 3, 7, for example via a fastening support 12 itself attached directly to the stator part 3 or to the fastening element 7. In this case, the electronic card 11 is supported by the fastening support 12, while coming into electronic connection, by connection means, in particular to the stator 3, 7.

Thus, a thermal path is created between the control unit 10 and the first elongated assembly 5, so that the latter also ensures the cooling of the control unit 10. Indeed, this configuration allows the conduction of the heat emitted by the control unit 10 towards the outside of the enclosure 1 along this thermal path and the first elongated assembly 5.

Alternatively, or in addition, and as illustrated in the example shown in FIGS. 5 and 6, the cooling means 5, 6 of the motorization system comprise at least a second elongated assembly, in this case the elongated assembly 6, which has already been presented above.

Just like the first elongated assembly 5, this second elongated assembly 6 is at least partially metallic. It is also fastened by a first end to the control unit 10, and protrudes in a watertight manner outside the enclosure 1 by a second end opposite its first end.

This configuration allows the conduction of heat from the control unit 10 to the outside of the enclosure 1 along the second elongated assembly 6.

This second elongated assembly 6, like the first elongated assembly 5, can be a rod 6, or can comprise a rod-shaped part.

The rod 5, 6 or the rod-shaped part of the first, respectively second, elongated assembly 5, 6, preferably has a substantially circular section.

The sealing means 13, respectively 16, presented above, can be O-rings.

As can be seen in the figures, the respective second end(s) of the first and/or second elongated assemblies 5, 6 have slats 8, 9 spaced apart and formed parallel to the axis of the first, respectively second, elongated assemblies 5, 6.

This configuration increases the heat exchange surface between the respective ends of the first and second elongated assemblies 5, 6 with the surrounding water, once the motorization system is integrated into the craft 30, and once this craft 30 is placed in or on the water. Thus, the slats 8 arranged at the second end of the first elongated assembly 5, and the slats 9 arranged at the second end of the second elongated assembly 6, form radiators which make it possible to disperse the heat more quickly in the surrounding water thanks to an increased heat exchange surface.

As can also be seen in the figures, in the examples shown, the motorization system includes a motor part of the "outrunner" type. Thus, the rotor 2 comprises a rotating cage 2, and the stator 3, 7 comprises a fixed core 3 arranged inside the cage 2.

As explained above, this configuration is particularly interesting because it makes it possible to rotate the rotor less quickly than in a configuration with an "inrunner" type motor (fixed cage and rotating core), by maximizing the diameter of interaction between the coils arranged in the center and the magnets arranged on the periphery. This configuration therefore does not require the use of a reducer, which lower cost and maintenance.

By leaning on a fixed element inside the enclosure 1, such as the stator 3, 7, to get the heat produced by the operation of the motor and conduct it outside, one also overcomes conventional solutions for cooling an "outrunner" type motor, such as water circulation systems inside the fixed part of the motor, and their complexity (pipes inside the motor, inlet and water outlet).

Alternatively, the motorization system can include an "inrunner" type motor part, with a rotating core and a fixed outer cage which can constitute enclosure 1.

In this case, the first elongated assembly 5 (and possibly the second elongated assembly 6) can rest on the enclosure 1 itself which constitutes the fixed part of the motor, to catch the heat produced by the operation of the motor and conduct it outside.

It is reminded that this description is given by way of example, and does not limit the invention.

In particular, and although finding a particularly interesting application in the field of surfboards, the invention is not limited to a craft of the surfboard type, but extends to crafts such as a paddleboard or sailboard.

More generally, the invention is not limited to a craft of the board type, but extends to any craft with electrical assistance, such as a canoe or a kayak.

The invention claimed is:

1. An electric motorization system for a craft, configured to be connected to a source of electric power, the system comprising:
   a watertight enclosure intended to be integrated into or on the craft, in which enclosure are arranged a rotor and a stator, and
   a shaft connected by a first end to the rotor and projecting in a watertight manner, with respect to the enclosure, outside of the enclosure by a second end opposite its first end, said shaft being adapted to be connected by its second end to means of propulsion of a craft, so that when the system is supplied with electrical energy, the rotor begins to rotate and drives the shaft in this rotation, the system further comprising cooling means,
   wherein said cooling means comprise at least a first elongated assembly, at least partially metallic, a first end of which is arranged inside the enclosure, the said elongated assembly protruding in a watertight manner outside the enclosure by a second end opposite its first end, so as to allow conduction of heat from the inside to the outside of the enclosure along said first elongated assembly; and
   further comprising an electronic control unit configured to control the operation and the electrical energy supply of the said system, and fastened to the stator, so as to create a thermal path between the control unit and the first elongated assembly to allow the conduction of the heat emitted by the control unit to the outside of the enclosure along said thermal path and the first elongated assembly.

2. The system according to claim 1, wherein the first end of the first elongated assembly is fastened to the stator.

3. The system according to claim 2, wherein the stator comprises at least one fastening element, such as a fastening plate, and wherein the first end of the first elongated assembly is linked to said fastening element.

4. The system according to claim 2, wherein the first elongated assembly comprises at least a first part, formed integrally with at least a part of the stator.

5. The system according to claim 2, wherein the first elongated assembly comprises at least a first part, forced into a housing provided in the stator, said housing comprising a pasty heat-conducting material, such as a heat-conducting silicone.

6. The system according to claim 5, wherein at least the first part of the first elongated assembly is a rod.

7. The system according to claim 6, wherein the first elongated assembly is a rod of circular section protruding from the enclosure in a watertight manner by means of an O-ring.

8. The system according to claim 6, wherein the rod has a substantially circular section.

9. The system according to claim 1, wherein the rotor comprises a rotating cage, and the stator comprises a fixed core arranged inside the cage.

10. The system according to claim 1, wherein the rotor comprises a rotating cage, and the stator comprises a fixed core arranged inside the cage.

11. A craft with electrical assistance, comprising means of propulsion capable of allowing the craft to progress on or in the water, and a source of electrical energy, further comprising an electric motorization system according to claim 1, the watertight enclosure of which is integrated on or in the craft, and whose shaft is connected by its second end to the propulsion means, so as to allow the drive of the propulsion means when the electric motorization system is supplied with electrical energy by said source, and the cooling of the electric motorization system by heat exchange between the second end of the first elongated assembly and the surrounding water;
   wherein at least the first part of the first elongated assembly is a rod.

12. The system according to claim 11, wherein the rod has a substantially circular section.

13. The system according to claim 12, wherein the first elongated assembly is a rod of circular section protruding from the enclosure in a watertight manner by means of an O-ring.

14. The craft according to claim 11, said craft being a surfboard, or a paddleboard, or a sailboard, or of the canoe type, or of the kayak type.

15. The system according to claim 1, wherein the second end of the first elongated assembly has slats spaced apart and formed parallel to the axis of the first elongated assembly.

16. An electric motorization system for a craft, configured to be connected to a source of electric power, the system comprising:
   a watertight enclosure intended to be integrated into or on the craft, in which enclosure is arranged a rotor and a stator, and
   a shaft connected by a first end to the rotor and projecting in a watertight manner outside of the enclosure by a second end opposite its first end, said shaft being adapted to be connected by its second end to means of propulsion of a craft, so that when the system is supplied with electrical energy, the rotor begins to rotate and drives the shaft in this rotation, the system further comprising cooling means,
   wherein said cooling means comprise at least a first elongated assembly, at least partially metallic, a first end of which is arranged inside the enclosure, the said elongated assembly protruding in a watertight manner outside the enclosure by a second end opposite its first end, so as to allow conduction of heat from the inside to the outside of the enclosure along said first elongated assembly; and
   further comprising an electronic control unit arranged inside the enclosure and configured to control the operation and the supply of electrical energy of the system, and
   wherein the cooling means comprise at least a second elongated assembly, at least partially metallic, fastened by a first end to the control unit and projecting in a watertight manner outside the enclosure by a second end opposite its first end, so as to allow the conduction of heat from the control unit to the outside of the enclosure along the second elongated assembly.

17. The system according to claim 16, wherein at least a part of the second elongated assembly is a rod with a substantially circular section.

18. The system according to claim 17, wherein the second elongated assembly is a rod of circular section protruding from the enclosure in a watertight manner by means of an O-ring.

19. The system according to claim 16, wherein the second end of the second elongated assembly has slats spaced apart and formed parallel to the axis of the second elongated assembly.

* * * * *